F. W. NAUMANN.
REGISTER.
APPLICATION FILED NOV. 25, 1914.
1,164,663.
Patented Dec. 21, 1915.
4 SHEETS—SHEET 1.
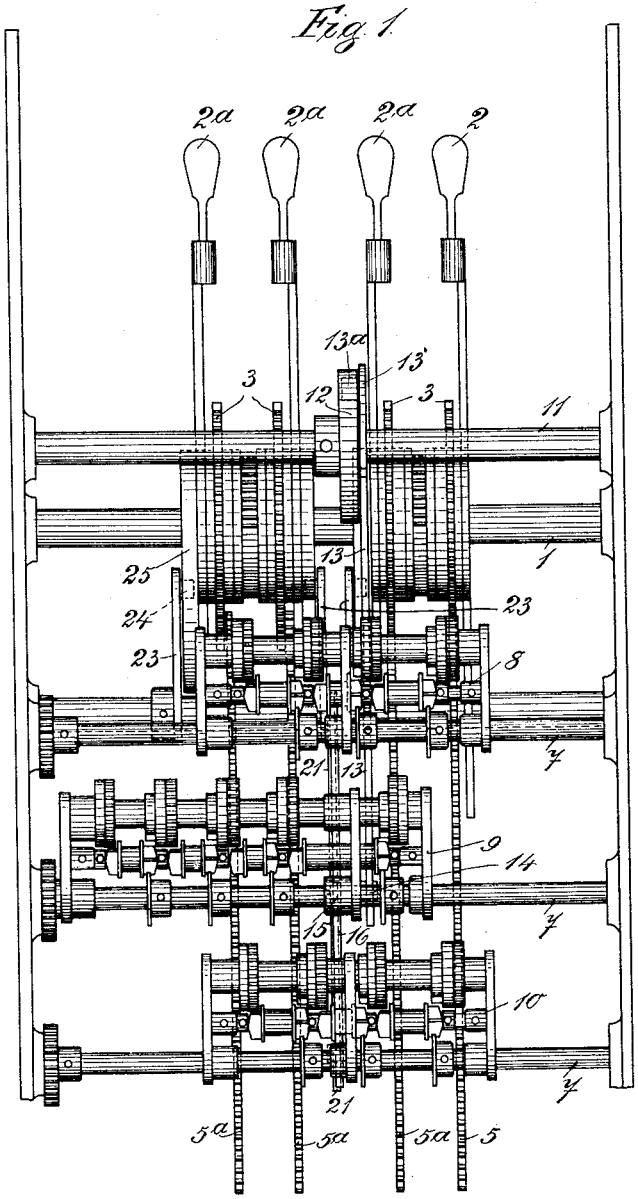

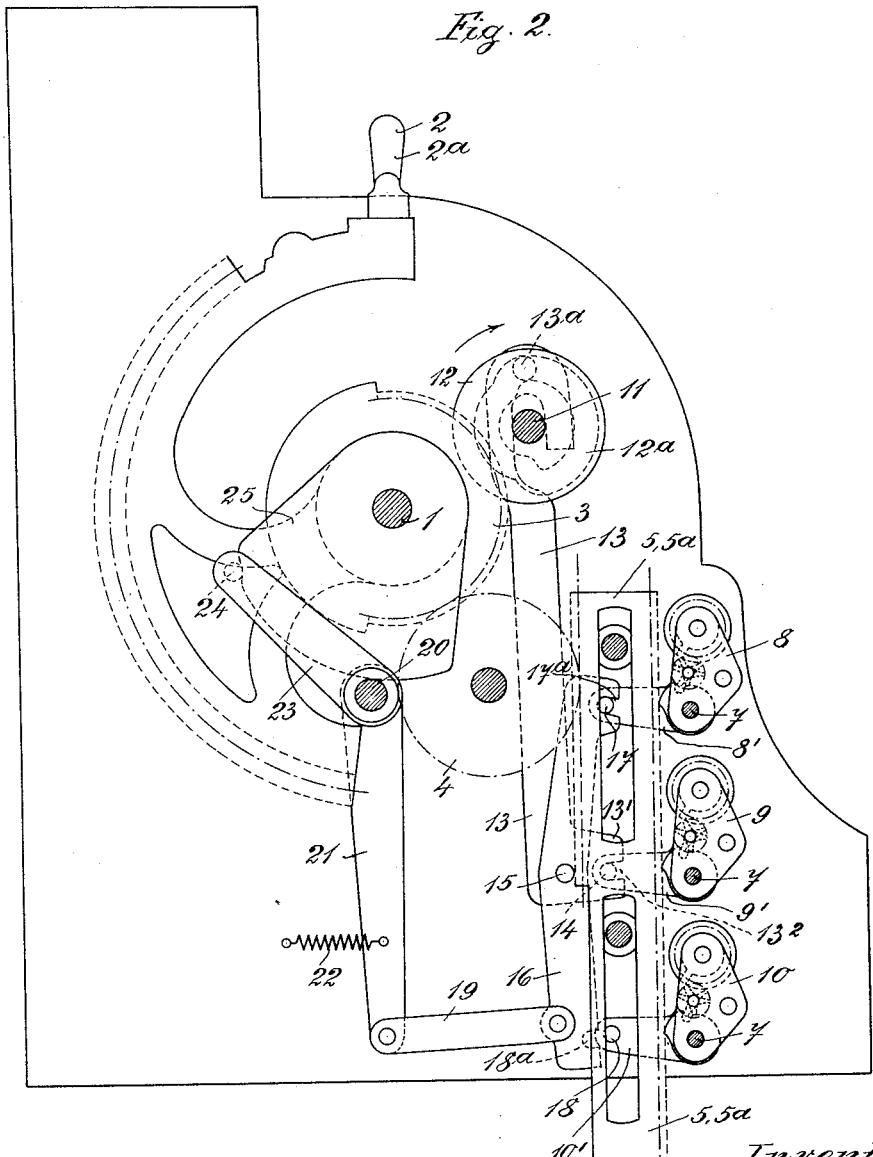

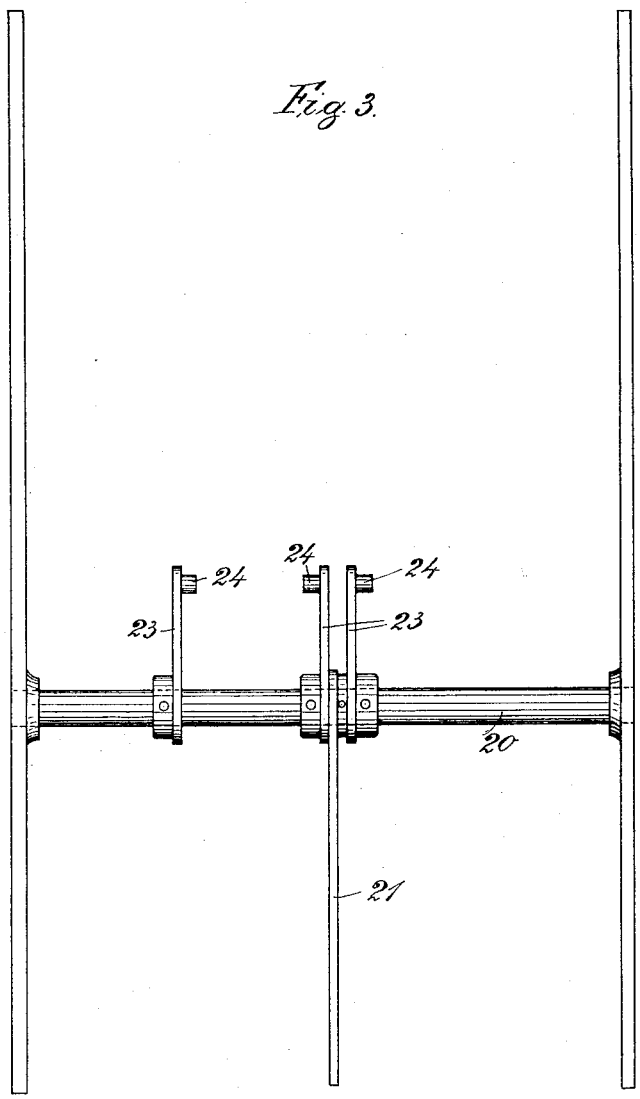

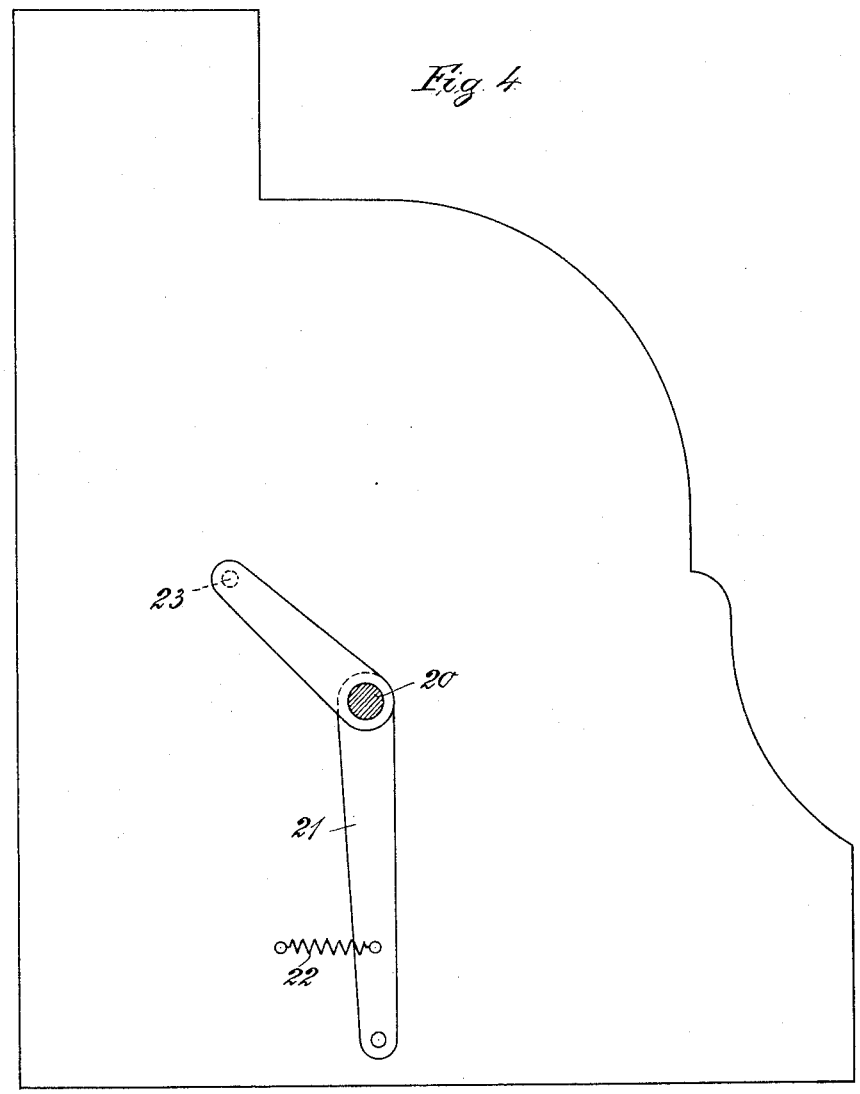

UNITED STATES PATENT OFFICE.

FRIEDRICH WILLY NAUMANN, OF BIELEFELD, GERMANY.

REGISTER.

1,164,663.  Specification of Letters Patent.  Patented Dec. 21, 1915.

Application filed November 25, 1914. Serial No. 873,855.

*To all whom it may concern:*

Be it known that I, FRIEDRICH WILLY NAUMANN, a citizen of the German Empire, residing at Bielefeld, Germany, have invented certain new and useful Improvements in Registers; and I do hereby declare the following to be a full, clear, and exact description of the invention, such as will enable others skilled in the art to which it appertains to make and use the same.

My invention relates to improvements in registers, and more particularly in registers of that class in which several adding mechanisms are provided, and which are used for example for registering the number of objects received for storage, for registering the number of the objects which have been given out and the amount which has been paid for storing the objects. In apparatus of this class such as are now in use separate registers have been provided, one of said registers being provided for registering and adding the number of objects received for storage and a second one being provided for registering the number of the objects which have been given out and the amount of money received for storing the articles. The last named register is provided with two adding mechanisms for simultaneously registering and adding different values.

One of the objects of the improvements is to provide a register of this class by means of which all the above operations can be performed, so that a single register is provided which is equipped with three adding mechanisms, one of which records the number of the articles received for storage, the second one the number of the articles which have been given out, and the third one the fee paid for storing the articles. The said fee is paid only once, that is either when receiving the articles or when giving the same out. Therefore, according as the fee is paid when receiving the articles or when giving the same out, during one of the registering operations the adding mechanism for the amount paid is thrown out of operation, while it is set in operative position during the other one of the operations. In the preferred form of the invention a single setting mechanism is provided which is operative when registering the number of the articles which are received and when registering the number of the articles which have been given out, and when together with the number of the articles received or given out the fee is registered and added, the registering mechanism which is not used is set in inoperative position, and when an operation is performed which does not include the registering of the fee the said registering mechanism is automatically set in operative position.

For the purpose of explaining the invention an example embodying the same has been shown in the accompanying drawings, in which the same letters of reference have been used in all the views to indicate corresponding parts.

In said drawings Figure 1, is a front view of the mechanism of the apparatus, Fig. 2, is a side view of the same, and Fig. 3, is a rear view of a part of the mechanism, Fig. 4, is a side view of it.

In the example illustrated in the drawings setting members 2 and $2^a$ are loosely mounted on a shaft 1, the setting members $2^a$ being provided for setting the amount of money, and the setting member 2 being provided for setting the number of the articles received for storage or given out. The setting members are provided with coupling means of any known or preferred construction (not shown), and they are adapted to operate by means of gear wheels 3 and 4 racks 5 and $5^a$ respectively for driving three adding mechanisms 8, 9, and 10 of any known or preferred construction, the adding mechanisms 8 and 10 and the rack 5 being controlled by the setting member 2, and the adding mechanism 9 being controlled by the setting members $2^a$. The adding mechanisms have rocking supports on shafts 7.

On a shaft 11 a disk 12 is rotatably mounted which coöperates with a rod 13 engaging with a roller $13^a$ in a cam groove $12^a$ of the disk. The rod 13 is formed with a nose 13′ which is formed with a notch $13^2$ by means of which it engages a roller 14 or the like provided on an arm 9′ of the adding mechanism 9. On a pivot bolt 15 secured to the link 13 a rocker 16 is mounted and the arms of the said rocker are formed at their ends with notches $17^a$ and $18^a$ adapted to engage respectively pins 17 and 18 provided on arms 8′ and 10′ of the adding mechanisms 8 and 10. In the position shown in Fig. 2 the notch $17^a$ engages the roller 17, while the notch $18^a$ is out of engagement with the pin 18. The rocker 16 is connected by a link 19 with a lever 21 which is keyed to a shaft 20. To the shaft 20 three arms 23 are secured one for each of the setting members 2ª. A spring 22 tends to force the arms 23 with rollers 24 provided thereon into engagement with the circumference of cam disks 25 which are rigidly connected one with each of the setting members.

The operation of the apparatus is as follows: In the example shown in the drawings the fee is paid when the articles are being given out, and no fee is to be paid and registered when the articles are received. In this case when the article is received only the setting member 2 for registering the number of the received articles is set. The number which has been set on the setting member 2 is transmitted by the rotation of the machine crank and through the coupling device (not shown) to the rack 5, and simultaneously by the rotation of the shaft 11 the rod 13 is moved downward by the cam disk 12. Thereby the adding mechanism 8 for registering the number of the articles which have been received is brought into engagement with the rack 5, and the adding mechanism 9 for registering the fee is brought into engagement with the racks 5ª which however are not moved because the setting members 2ª for registering the fee have not been set. When registering the number of the articles the levers 19, 21, 23, and the rocking lever 16 assume the positions shown in Fig. 2, in which the notch 17ª engages the pin 17 provided on the adding mechanism 8. Therefore this adding mechanism is thrown into operation when the rod 13 and the lever 16 are moved. When the articles are being given out apart from the number of the articles the fee paid for storing the articles must be registered. Therefore not only the setting mechanism 2, but also one or more setting mechanisms 2ª must be set. When doing this cam disks 25 rock the levers 16, 19, 21, and 23 in opposition to the spring 22. Thereby the notch 18ª of the rocking lever 16 is brought into engagement with the pin 18 provided on the arm of the adding mechanism 10 for registering the number of the articles which have been given out. If now the rod 13 is raised, and, after setting the setting members 2ª not only the rack 5 but also one or more of the racks 5ª are operated by turning the crank of the machine, the adding mechanism 9 registering the fee paid and the adding mechanism 10 registering the number of the articles which have been given out are shifted. After the setting members 2ª for the price have returned into zero positions, the spring 22 causes the levers 16, 19, 21, and 23 to rock backward and into the positions shown in Fig. 2. Now only the adding mechanism 8 for registering the number of the articles which are being received are coupled with the link 13 and the rocking lever 16. The adding mechanisms 8 and 10 are arranged in such a way, that in the position shown in Fig. 2 they are out of engagement with the racks 5ª.

I claim herein as my invention:

1. In a register, the combination with at least three registering mechanisms, and at least two setting mechanisms adapted to coöperate one with one of the registering mechanisms and the other one with both of the other registering mechanisms, and means controlled by the setting mechanism which coöperates with one only of the registering mechanisms to throw the setting mechanism which controls two registering mechanisms into coöperation with either one of the said registering mechanisms controlled thereby.

2. In a register, the combination with at least three registering mechanisms, and at least two setting mechanisms adapted to coöperate one with one of the registering mechanisms and the other one with both of the other registering mechanisms, means operative when actuating the setting mechanism which coöperates with one only of the registering mechanisms to throw the other setting mechanism into coöperation with one of the registering mechanisms controlled thereby, and automatic means to throw the said other setting mechanism out of coöperation with the registering mechanism with which it has been thrown into coöperation by the setting mechanism which coöperates with one only of the registering mechanisms and into coöperation with the other one of the registering mechanisms controlled thereby.

3. In a register, the combination with at least two setting members, at least two operating members controlled by said setting members, and at least three registering mechanisms adapted to be operated one by one of said operating members and both of the other ones by the second one of the operating members and normally out of engagement therewith, of a shiftable member operatively connected with the setting mechanism which coöperates with a single registering mechanism and adapted to throw the last named registering mechanism into coöperation with its operating member, a rocker on said shiftable member adapted to throw the registering mechanisms which are controlled by the same setting mechanism into engagement with their setting mechanism, and means to throw said rocker into engagement with either one of the registering mechanisms controlled thereby.

4. In a register, the combination with at least two setting members, at least two operating members controlled by said setting members, and at least three registering mechanisms adapted to be operated one by one of said operating members and both of the other ones by the second one of the operating members and normally out of engagement therewith, of a shiftable member operatively connected with the setting mechanism which coöperates with a single registering mechanism and adapted to throw the last named registering mechanism into coöperation with its operating member, a rocker on said shiftable member adapted to throw the registering mechanisms which are controlled by the same setting mechanism into engagement with their setting mechanism, means connected with the setting mechanism which coöperates with a single registering mechanism to throw said rocker into engagement with one of the registering mechanisms controlled thereby, and automatic means to throw the rocker into engagement with the other registering mechanism controlled thereby.

5. In a register, the combination with at least two setting members, at least two operating members controlled by said setting members, and at least three registering mechanisms adapted to be operated one by one of said operating members and both of the other ones by the second one of the operating members and normally out of engagement therewith, of a shiftable member operatively connected with the setting mechanism which coöperates with a single registering mechanism and adapted to throw the last named registering mechanism into coöperation with its operating member, a rocker on said shiftable member adapted to throw the registering mechanisms which are controlled by the same setting mechanism into engagement with their setting mechanism, cams and levers connected with the setting mechanism which coöperates with a single registering mechanism to throw said rocker into engagement with one of the registering mechanisms controlled thereby, and automatic means to throw the rocker into engagement with the other registering mechanism controlled thereby.

In testimony whereof I affix my signature in presence of two witnesses.

FRIEDRICH WILLY NAUMANN.

Witnesses:
T. FLENOLZ REED,
MARIE BOHNE.

Copies of this patent may be obtained for five cents each, by addressing the "Commissioner of Patents, Washington, D. C."